(12) United States Patent
Zijlman et al.

(10) Patent No.: US 10,880,964 B2
(45) Date of Patent: Dec. 29, 2020

(54) METHOD AND APPARATUS FOR DRIVING AN LED

(71) Applicant: SIGNIFY HOLDING B.V., Eindhoven (NL)

(72) Inventors: Theo Gerrit Zijlman, Tilburg (NL); Bertrand Johan Edward Hontele, Breda (NL); Henricus Marius Joseph Maria Kahlman, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/620,966

(22) PCT Filed: Jun. 5, 2018

(86) PCT No.: PCT/EP2018/064717
§ 371 (c)(1),
(2) Date: Dec. 10, 2019

(87) PCT Pub. No.: WO2018/228858
PCT Pub. Date: Dec. 20, 2018

(65) Prior Publication Data
US 2020/0107425 A1 Apr. 2, 2020

(51) Int. Cl.
*H05B 45/325* (2020.01)
*H05B 45/14* (2020.01)
*H05B 45/375* (2020.01)
*H05B 45/48* (2020.01)

(52) U.S. Cl.
CPC ........... *H05B 45/325* (2020.01); *H05B 45/14* (2020.01); *H05B 45/375* (2020.01); *H05B 45/48* (2020.01)

(58) Field of Classification Search
CPC ........ H05B 45/37; H05B 45/10; H05B 47/19; H05B 45/00; H05B 47/10; H05B 45/20; H05B 45/50; H05B 47/105; H05B 47/175; H05B 45/48; H05B 47/18
USPC .................. 315/224, 291, 307, 297, 86, 294
See application file for complete search history.

(56) References Cited

U.S. PATENT DOCUMENTS

| | | |
|---|---|---|
| 7,759,881 B1 | 7/2010 | Melanson |
| 2006/0238174 A1* | 10/2006 | Russell ................. H05B 45/37 323/229 |
| 2011/0156612 A1 | 6/2011 | Kanamori et al. |
| 2012/0018194 A1 | 1/2012 | Maeda et al. |
| 2013/0038234 A1 | 2/2013 | Van Der Veen et al. |
| 2016/0174319 A1 | 6/2016 | Li et al. |

(Continued)

FOREIGN PATENT DOCUMENTS

EP 2519079 A1 10/2012

*Primary Examiner* — Wei (Victor) Y Chan
(74) *Attorney, Agent, or Firm* — Daniel J. Piotrowski (57) ABSTRACT

Disclosed is a method and apparatus for overcoming LED flicker caused by an asynchronous control of an LED on or off state and a switched-mode power supply for the LED. A supplementary control system is adapted to override a primary control system for the switched-mode power supply, and control an energy storage inductor of the switched-mode power supply. In particular, in response to an indicated desire to switch the LED on, the supplementary control system sets the current in the energy storage inductor to a predetermined level. In this way, when the LED is switched on, the current through the inductor is known and LED flicker is thereby reduced.

13 Claims, 6 Drawing Sheets

(56) References Cited

U.S. PATENT DOCUMENTS

| | | |
|---|---|---|
| 2016/0190921 A1 | 6/2016 | Kumar et al. |
| 2016/0190926 A1 | 6/2016 | Ni et al. |
| 2017/0006683 A1 | 1/2017 | Shiyu et al. |
| 2017/0164438 A1 | 6/2017 | Arulandu et al. |

* cited by examiner

METHOD AND APPARATUS FOR DRIVING AN LED

CROSS-REFERENCE TO PRIOR APPLICATIONS

This application is the U.S. National Phase application under 35 U.S.C. § 371 of International Application No. PCT/EP2018/064717, filed on Jun. 5, 2018, which claims the benefit of European Patent Application No. 17175504.4, filed on Jun. 12, 2017. These applications are hereby incorporated by reference herein.

FIELD OF THE INVENTION

This invention relates to the field of lighting drivers for LEDs.

BACKGROUND OF THE INVENTION

Solid state lighting units, and in particular LED-based luminaires, are increasingly popular in homes, offices and other buildings. Besides their high efficiency they also attract consumers due to new design features, different color temperatures, dimming abilities etc.

A variety of methods have been employed to enable dimming of an LED. For example, an on or off state of an LED may be controlled by a pulse-width modulation (PWM) signal operating according to a pulse-width modulation scheme. Alternatively, a lighting driver of the LED may comprise a switched-mode power supply adapted to alter an average voltage/current provided to the LED. Particularly advantageous embodiments employ both of these methods in order to provide an increased level of control over an LED output and to allow for extremely deep dimming.

However, issues can arise at low dimming levels due to a hysteresis of the power provided by the switched-mode power supply to the LED. In particular, when a pulse width of the PWM signal is low (e.g. at low dimming), each pulse of a PWM signal will be associated with a different average current through the LED, resulting in LED flicker.

A higher switching frequency and/or lower hysteresis of the switched-mode power supply can decrease this LED flicker, but may result in significant energy losses. Synchronization of the PWM signal to the switching of the switched-mode power supply (e.g. using an enable pin of the switched-mode power supply) is an alternative solution, but this may cause significant start-up delay. Moreover, the maximum duty cycle of the PWM signal will be limited, leading to an increased LED energy loss.

SUMMARY OF THE INVENTION

The invention is defined by the claims.

According to examples in accordance with an aspect of the invention, there is provided an LED lighting driver for a lighting arrangement having an LED, wherein an on or off state of the LED is controlled by a lighting control signal. The LED lighting driver comprises: a switched-mode power supply comprising: an inductor connectable to the lighting arrangement, wherein a current through the inductor defines a current through the lighting arrangement; and a primary control system adapted to maintain a current through the inductor and lighting arrangement within a predetermined range using a switching regulator. The LED lighting driver also comprises a supplementary control system adapted to: receive a supplementary control signal indicating a desired off-on transition of the LED; and in response to the supplementary control signal indicating a desire to switch the LED to an on-state, override the primary control system and alter a current through the inductor. The LED lighting driver also comprises a lighting control system adapted to output the lighting control signal and, in response to the current through the inductor being altered by the supplementary control system and reaching a predetermined level, control the lighting control signal so as to switch the LED to an on-state.

The method results in a same average current being provided through the LED for different off-on transitions of the LED, without the need for synchronizing a switched-mode power supply and an LED control signal. This results in reduced LED flicker.

In particular, when there is a desire to switch an LED on (e.g. according to a pulse-width modulation scheme or at LED start-up) the switched-mode power supply is interrupted by a secondary control system and a lighting control system. The secondary control system alters a current through an inductor until it reaches a predetermined level. Subsequently, the lighting control system switches the LED on.

Thus, a current through the LED may be predetermined prior to an LED being switched from an off-state to an on-state, ensuring that there is no LED flicker. The proposed method provides a low-power implementation of reducing a current flicker of an LED at low dimming levels. Moreover, the method has significantly reduced start-up times over previously considered methodologies.

The supplementary control system may be adapted to selectively couple a first end of the inductor to a reference voltage. This provides a simple and low-power apparatus for controlling a current through the inductor.

Optionally, the supplementary control system comprises a transistor and resistor connected in series between the first end of the inductor and the reference voltage. Thus, the supplementary control system may comprise a current source for controlling the current through the inductor.

In some embodiments, the lighting driver is adapted such that the switched-mode power supply comprises a diode coupled between a first end of the inductor and the lighting arrangement; wherein a second end of the inductor is coupled to the lighting arrangement; and the primary control system of the switched-mode power supply is adapted to selectively couple the first end of the inductor to a reference voltage.

Thus, the lighting driver may comprise a buck converter adapted to control a current through the LED. Such an embodiment provides a simple and low-power mechanism for regulating a current through and voltage across the LED.

The supplementary control signal and/or the lighting control signal is optionally a pulsing signal in accordance with a pulse width modulation scheme for the LED. The lighting control signal may also be a pulsing signal having a same frequency as the supplementary control signal.

The LED may thereby be controlled according to a pulse width modulation scheme. This enables a significant level of control over the dimming capabilities of the LED whilst minimizing the LED flicker. The advantages of the present invention are particularly prominent when the LED is controlled according to a pulse-width modulation scheme, as an average current in an on-state pulse is maintained is maintained substantially the same for consecutive on-state pulses.

The supplementary control system may be further adapted to override the primary control system only when the lighting control signal is a pulsing signal in accordance with a pulse width modulation scheme for the LED, and a desired pulse width of the lighting control signal is below a predetermined pulse width value.

Thus, the supplementary control system may only activate when a deep dimming of the LED is desired. In particular, the supplementary control scheme only activates when a deep dimming of the LED is performed by a pulse-width modulation scheme. This improves a power efficiency of the lighting driver, as the supplementary system is activated only when the effects of dimming (LED flicker) begin to appear.

The predetermined value is optionally determined based on a switching frequency of the switched-mode power supply. For example, the predetermined pulse width value may be approximately equal to the reciprocal of the switching frequency (i.e. the switching period) or half the switching period or possibly a quarter of the switching period.

The supplementary control system may be further adapted to maintain a current through the inductor at the predetermined level at least whilst the lighting control signal controls the LED to be in the on-state.

This ensures that a current through the LED is kept at a constant level whilst the LED is on, thereby further minimizing an LED flicker and also provides a more consistent output of light.

The supplementary control system may be adapted to no longer override the primary control system and no longer alter the current through the inductor in response to the current through the inductor reaching the predetermined level.

Such an embodiment similarly ensures an LED flicker is reduced, whilst minimizing a power loss due to, for example, current drain by the supplementary control system.

Embodiments may provide a luminaire comprising: the lighting driver as previously described; and a lighting arrangement comprising an LED, wherein an on or off state of the LED is controlled by the lighting control signal.

In some embodiments, the lighting arrangement further comprises a bypass transistor connected in parallel with the LED, wherein the bypass transistor is adapted to control a current flow in the LED based on the lighting control signal.

There is therefore proposed a simple method of controlling whether an LED is in an on-state (i.e. conducting current and emitting light) or an off state (i.e. not conducting current and emitting no light) with minimal power drain and a relatively fast start-up time.

According to examples in accordance with an aspect of the invention, there is provided a method of controlling an LED of a lighting arrangement, wherein an on or off state of the LED is controlled by a lighting control signal, the method comprising: using a primary control system, maintaining a current through an inductor of a switched-mode power supply within a predetermined range, wherein a current through the inductor defines a current through the lighting arrangement; receiving a supplementary control signal indicative of a desired on or off state of the LED; using a supplementary control system and in response to the supplementary control signal indicating a desire to switch the LED to the on-state, overriding the primary control system and altering a current through the inductor of the switched-mode power supply; and using a lighting control system adapted to output the lighting control signal, in response to supplementary control system altering the current through the inductor of the switched-mode power supply and the current through the inductor reaching a predetermined level, controlling the lighting control signal so as to switch the LED to an on-state.

In some embodiments, the supplementary control signal is a pulsing signal in accordance with a pulse width modulation scheme for the LED.

The method may further comprise using the supplementary control system, maintaining a current through the inductor at the predetermined level at least whilst the lighting control signal controls the LED to be in an on-state.

The method may otherwise comprise no longer overriding the primary control system and no longer altering the current through the inductor using the supplementary control system, in response to the current through the inductor reaching the predetermined level.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a method and apparatus for overcoming LED flicker caused by an asynchronous control of an LED on or off state and a switched-mode power supply for the LED. There is provided a supplementary control system adapted to override a primary control system for the switched-mode power supply, and control an energy storage inductor of the switched-mode power supply. In particular, in response to an indicated desire to switch the LED on, the supplementary control system sets the current in the energy storage inductor to a predetermined level. In this way, when the LED is switched on, the current through the inductor is known and LED flicker is thereby reduced.

According to a concept of the invention, there is proposed a supplementary control system for a LED lighting driver having a switched-mode power supply. The supplementary control system ensures that a current through an inductor is at a predetermined value before an LED is switched to an on-state. This ensures, particularly if the LED is controlled according to a PWM scheme, that an LED flicker is minimized.

Embodiments are at least partly based on the realization that LED flicker of a LED undergoing pulse width modulation may be minimized if it is ensured that a current provided to the LED is at a set or known value when the LED is pulsed. Thus, a profile of a current supplied to an LED is substantially the same for successive LED on-state pulses.

Illustrative embodiments may, for example, be employed in lighting integrated power architectures. Particular advantages are realized in lighting architectures that require deep dimming capabilities (i.e. low intensity light output).

As used herein, an "on-state" of an LED generally refers to a state in which the LED conducts current and emits light; an "off-state" of an LED generally refers to a state in which the LED does not conduct current or emit light.

Figure 1:
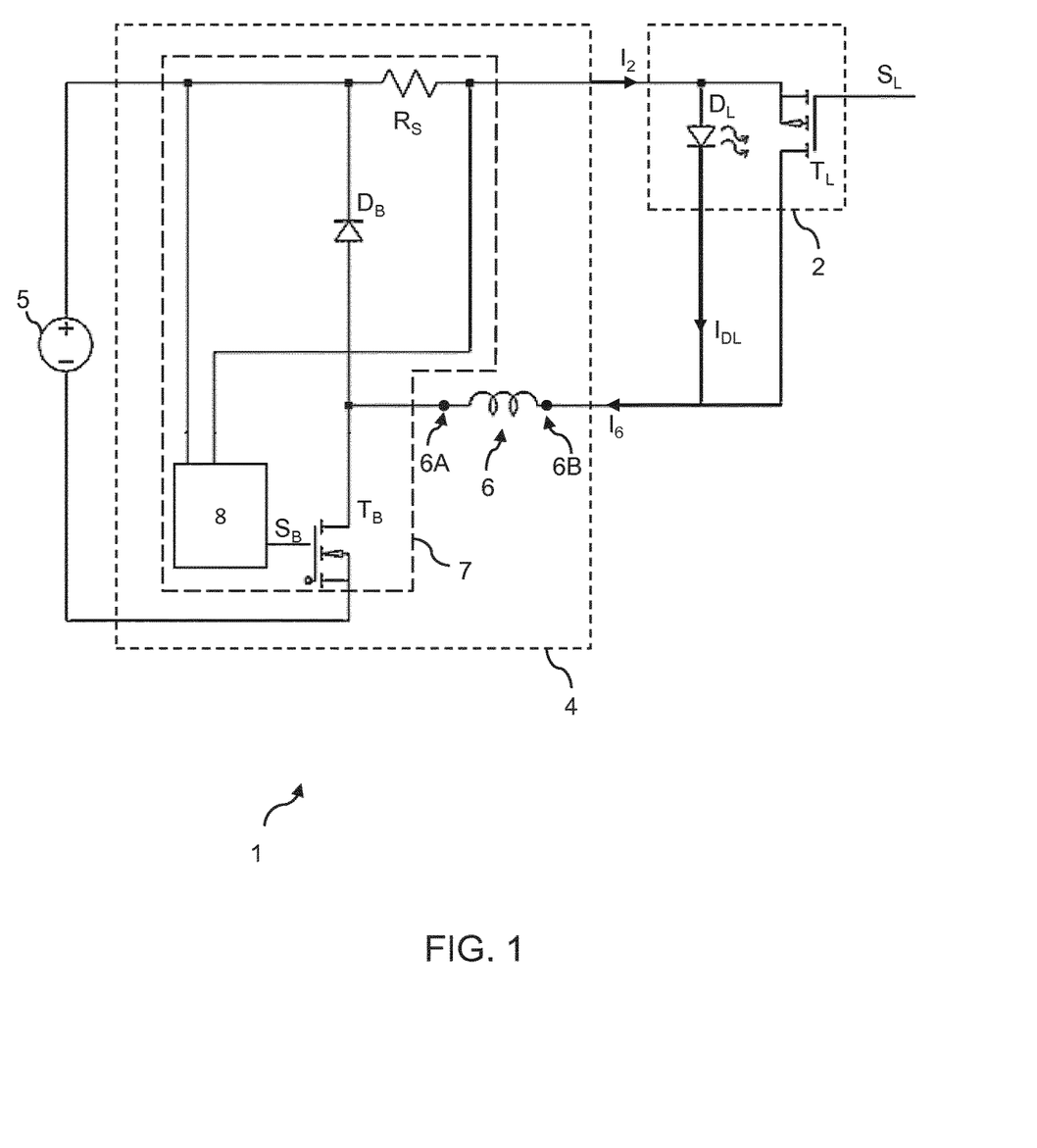
FIG. 1 illustrates a circuit diagram of a luminaire.

FIG. 1 illustrates a circuit diagram of a luminaire 1. The luminaire 1 comprises a lighting arrangement 2 and a lighting driver, formed solely of a switched-mode power supply 4. A DC power source 5, such as a bus voltage source, provides power to the switched-mode power supply 4. Alternatively, the switched-mode power supply 4 may comprise a rectifier and be connected to an AC power source.

The lighting arrangement 2 comprises an LED $D_L$, where a current through the LED is controlled by a lighting control signal $S_L$. Thus, an on or off state of the LED $D_L$ is controlled by the lighting control signal $S_L$.

The lighting control signal $S_L$ controls the operation of a bypass transistor $T_L$, which is adapted to selectively bypass the LED $D_L$. For the purposes of this embodiment, the bypass transistor is an p-channel MOSFET, although other transistors may be used appropriately. When the bypass transistor $T_L$ is closed (i.e. the lighting control signal $S_L$ is low), the LED is in an off-state, when the bypass transistor $T_L$ is open (i.e. the lighting control signal $S_L$ is high), the LED is in an on-state.

To perform dimming, the LED $D_L$ may be pulse width modulated by the lighting control signal $S_L$. That is, the lighting control signal $S_L$ may be a pulsing signal, where the average pulse width affects the average intensity of output light by the LED. A frequency of the lighting control signal $S_L$, when performing pulse width modulation, is called a PWM frequency.

The lighting control signal $S_L$ may be provided by a lighting control system (not shown). The lighting control system may control the lighting control signal based on a desired dimming level, for example, as indicated in a dimming signal provided by a dimmer (not shown).

The switched-mode power supply 4 is a DC to DC power converter connectable between the DC power source 5 and the lighting arrangement 2. The switched-mode power supply 4 regulates a voltage and current provided to the lighting arrangement 2. Regulating a current is of particular importance to minimizing flicker in the lighting arrangement 2.

The switched-mode power supply 4 comprises an inductor 6 which is couplable to the lighting arrangement 2. A current through the inductor (inductor current $I_6$) defines a current through the lighting arrangement 2 (light arrangement current $I_2$). The switched-mode power supply 4 also comprises a primary control system 7, which is adapted to control the inductor current $I_6$. In particular, the primary control system 7 maintains the inductor current $I_6$ within a predefined range, to thereby regulate the current through and voltage across through the lighting arrangement 2.

The operation of a switched-mode power supply 4 is widely known to the skilled person, and may include a buck converter, a boost converter and/or a buck-boost converter. Typically, a switched-mode power supply comprises an inductor 6 and a switching regulator $T_B$, $D_B$ to control the current through the inductor. In some embodiments, the diode $D_B$ may be replaced by an active element (e.g. a BJT or a MOSFET) in order to create a synchronous rectified (i.e. buck) converter.

Nonetheless, a brief explanation of the switched-mode power supply 4, which here comprises a buck converter, is provided. Other switched-mode power supplies (e.g. where the inductor is instead selectively coupled to the DC power source 5) would be well known to the skilled person.

A switch $T_B$ selectively couples a first end 6A of the inductor 6 to a reference voltage (here: ground or earth). The switch is controlled by a buck switching signal $S_B$.

When the first end 6A of the inductor is held to the reference voltage (i.e. a switch $T_B$ closed state), the DC voltage source 5 drives the lighting arrangement 2 and the inductor 6. A voltage between the first end 6A and a second end 6B of the inductor is negative, as the inductor produces an opposing voltage across its terminals. A current through the inductor 6 and a magnetic field stored by the inductor 6 increases. A buck diode $D_B$ (i.e. a free-wheeling diode) will not conduct current, since the voltage at the anode (of the diode) is lower than the voltage at the cathode, as the first end 6A of the inductor (connecting to the anode) is held to the reference voltage. A current path therefore exists from the voltage source 5, through the lighting arrangement 2, through the inductor 6 and through the switch $T_B$ to a reference voltage.

When the first end 6A of the inductor is not held to the reference voltage (i.e. a switch $T_B$ open state), the magnetic field held by the inductor collapses. A polarity of the inductor reverses, and the inductor acts as a current source to the lighting arrangement 1. In particular, a current flow is provided from the first end 6A, through the buck diode $D_B$, through the lighting arrangement 2 and to the second end 6B of the inductor 6. The current across the inductor 6 gradually reduces as the magnetic field collapses. The voltage between the first end 6A and second end 6B of the inductor 6 is positive.

In this way, a current across the inductor, and thereby through the lighting arrangement, may be controlled by selectively coupling an end of the inductor to a reference voltage. In particular, the buck switching signal $S_B$ controls a rise and fall of the inductor current $I_6$ and thereby the current through the lighting arrangement 12. The current through the lighting arrangement is maintained to be within a predetermined range, so as to be substantially constant.

The operation of the switch $T_B$ (i.e. the buck switching signal $S_B$) is controlled by a current monitor 8, which monitors the current $I_2$ flowing through the lighting arrangement. This may be performed by determining a voltage across a sensing resistor $R_S$ serially connected to the lighting arrangement 2 (which will be proportional to the inductor current $I_6$). When the voltage across the sensing resistor rises above a first predetermined value, the switch $T_B$ may decouple the first end 6A of the inductor from the reference voltage. When the voltage across the sensing resistor $R_2$ falls below a second predetermined value, the switch may couple the first end 6A of the inductor to the reference voltage. In this way, a current may be maintained with a predetermined range (having an upper level and a lower level).

The switched-mode power supply 4 may thereby be associated with a buck switching frequency, being a frequency of the buck switching signal $S_B$. Altering the buck switching frequency alters the hysteresis of the inductor current $I_6$ and vice versa. For example, a user/controller may be able to input a desired inductor current $I_6$ or desired hysteresis (i.e. predetermined range) of the inductor current, and the switching frequency may be altered accordingly. The switching frequency is also determined by the variable output voltage (provided to the lighting arrangement), as well as input voltage of the voltage source 5 and the value of the inductor 6.

The current monitor 8 may alter the predetermined range of the inductor current $I_6$ by altering the first and/or second predetermined values or upper/lower levels of the predetermined range. The current monitor may thereby adjust the current through the lighting arrangement 2. This may be used to control a dimming of the LED $D_L$ by controlling a maximum voltage available to the LED. Such a dimming control may, for example, supplement the dimming provided by appropriate pulse-width modulation of the LED.

The switch $T_B$ and the buck diode $D_B$ may together be considered a switching regulator.

Typically, the buck switching frequency (e.g. around 200 kHz) is much higher than a PWM frequency of the lighting control signal $S_L$ (e.g. around 1 kHz). However, at very low dimming levels, the pulse duration of a pulse-width modulated lighting control signal $S_L$ will approach or go below the switching period (reciprocal of the buck switching frequency) of the switched-mode power supply. This undersampling of the buck switching frequency will lead to low-frequency current variation (through the LED $D_L$) for successive on-state pulses of the LED $D_L$ and thus visible flicker.

An asynchronous operation of the switched-mode power supply and the lighting control signal provides LED flicker at low intensities due to a very small duty cycle of the lighting control signal. It is therefore advantageous to provide synchronization of the switched-mode power supply with the lighting control signal.

Figure 2:
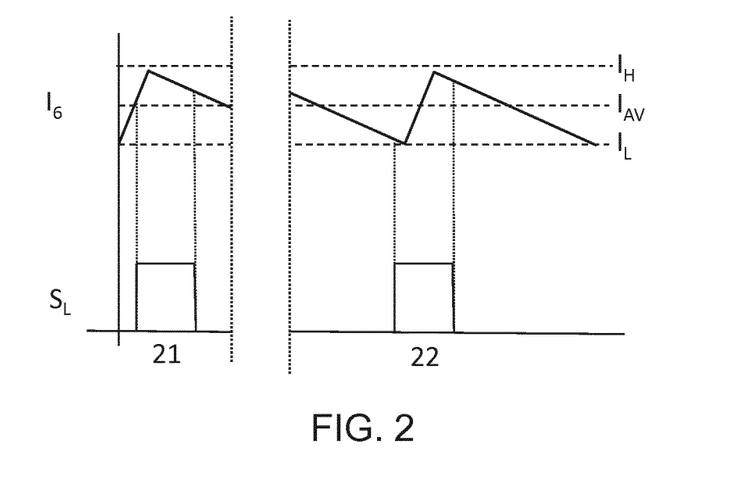
FIGS. 2 to 4 illustrates signals of the luminaire undergoing pulse width modulation.
Figure 3:
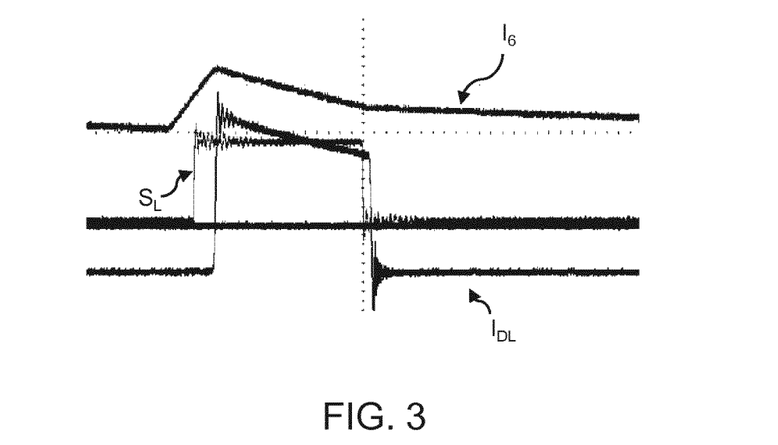
Figure 4:
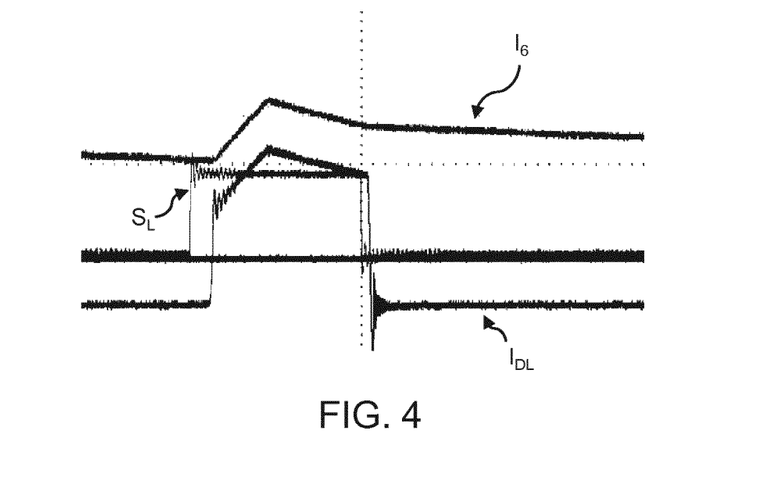

This issue is made more apparent with reference to FIGS. 2, 3 and 4, which illustrate currents of the luminaire 1 during low dimming. In the scenarios illustrated by these figures, the pulse width of the lighting control signal $S_L$, which defines the 'on-time' of the LED, is significantly smaller than a switching period of the buck switching signal $S_B$.

FIG. 2 illustrates the inductor current $I_6$ undergoing current regulation within a predetermined range, having an upper limit $I_H$ and a lower limit $I_L$. That is, the inductor current $I_6$ is alternated by the primary control system 7 between a lower limit $I_L$ and an upper limit $I_H$. In particular, the primary control system switches between a charging phase of the inductor and a discharging phase of the inductor. This maintains an average inductor current $I_{AV}$, as well as an average voltage supplied to the lighting arrangement.

FIG. 2 also illustrates the lighting control signal $S_L$, which defines an on or off state of the LED. That is, when the lighting control signal $S_L$ is high, the LED is in an on-state and emits light. When the lighting control signal $S_L$ is low, the LED is in an off-state and emits no light.

FIGS. 3 and 4 illustrate the inductor current $I_6$, a current through the LED $D_L$ (LED current $I_{DL}$) and the lighting control signal $S_L$. When the lighting control signal $S_L$ is triggered, there is a small delay before the LED $D_L$ is switched on. When the LED $D_L$ is switched on, the LED current $I_{DL}$ tracks the inductor current $I_6$.

In a first scenario 21 (FIG. 3), the lighting control signal $S_L$ is triggered shortly after the buck switching signal $S_B$ controls the inductor current $I_6$ to rise, and in a second scenario 22 (FIG. 4) the lighting control signal $S_L$ is triggered shortly before the buck switching signal $S_B$ controls the inductor current $I_6$ to rise. If the buck switching signal $S_B$ and the lighting control signal $S_L$ are asynchronous to one another, these two scenarios may occur in close proximity to one another (e.g. in successive pulses 21, 22 of the lighting control signal $S_L$), as illustrated in FIG. 2.

There may a number of cycles of the buck switching signal $S_B$ between the two pulses 21, 22 of the lighting control signal (e.g. due to differences in frequencies). This makes the phase relation between the buck switching signal $S_B$ and the lighting control signal $S_L$ difficult to predict.

It is clear that the average of the LED current $I_{DL}$ during the LED 'on-state' will be different in the two scenarios. This is due to the variance of the current through the inductor, caused by the switching regulator control inducing hysteresis, and the relatively short on-state period of the LED. Thus, if the buck switching signal and the lighting control are asynchronous, then an average LED current for each pulse of the lighting control signal $S_L$ may be different, resulting in LED flicker.

Figure 5:
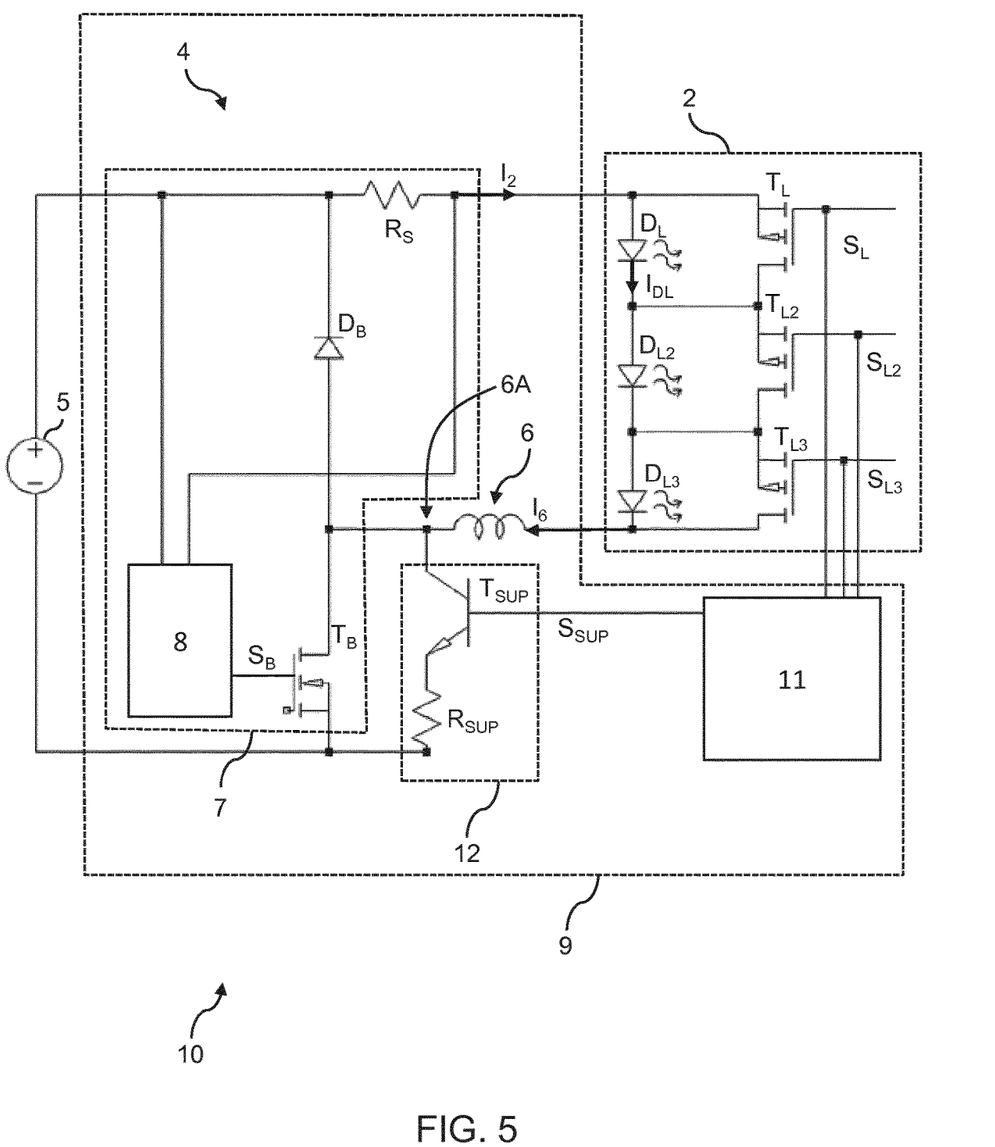
FIG. 5 illustrates a circuit diagram of a luminaire comprising a lighting driver according to an embodiment.

FIG. 5 illustrates a luminaire 10 comprising a lighting driver 9 according to an embodiment of the invention. The luminaire 10 comprises a lighting arrangement 2 and the lighting driver comprises a switched-mode power supply 4 as previously described. The voltage source 5 provides DC power to the switched-mode power supply 4.

The switched-mode power supply 4 operates in a same manner as the lighting driver 1, and shall not be repeated for the sake of brevity. It is noted that since shunt-switching may be applied for controlling brightness of the lighting arrangement, the switched-mode power supply may not comprise a capacitor. The lighting arrangement 2 also operates in a similar manner, and comprises an LED $D_L$ controlled by a lighting control signal $S_L$.

The lighting arrangement 2 may comprise one or more further LEDs, such as a second LED $D_{L2}$ and a third LED $D_{L3}$. Each further LED may be controlled by a respective control signal. For example, the second LED $D_{L2}$ may be controlled by a second lighting control signal $S_{L2}$ (controlling an operation of a second bypass transistor $T_{L2}$) and the third LED $D_{L3}$ may be controlled by a third lighting control signal $S_{L3}$ (controlling an operation of a third bypass transistor $T_{L3}$). In some embodiments, each LED is controlled by a same lighting control signal.

In some embodiments, the LEDs of the lighting arrangement may comprise a blue LED, a red LED and a green LED controlled by respective control signals. This would allow for a specific colors of the lighting arrangement to be provided.

Different LEDs may be controlled in different manners, so as to enable dimming of various aspects of a light spectrum output by the lighting arrangement. For example, if it is desired to output an orange light, a red LED may be maintained in an on-state, a blue LED may be maintained in an off-state, and a green LED may be pulse width modulated by a lighting control signal so as to be slightly dimmed.

The lighting control signal(s) may be a pulsing signal in accordance with a pulse width modulation scheme. In this way, the lighting control signal(s) can control an average intensity of light output by the lighting arrangement.

The lighting driver 10 comprises a supplementary control system 12 adapted to override the primary control system 7 of the switched-mode power supply 4.

The supplementary control system is adapted to controllably couple the first end 6A of the inductor 6 to a reference voltage (e.g. earth or ground). Thus, the supplementary control system 7 can control the inductor current $I_6$ in much the same manner as the switch $T_B$ controls the inductor current $I_6$.

Preferably, the supplementary control system 12 comprises a supplementary transistor $T_{SUP}$ and a supplementary resistor $R_{SUP}$ connected in series. A supplementary control signal $S_{SUP}$ controls the operation of the supplementary transistor $T_{SUP}$. The supplementary control signal $S_{SUP}$ thereby provides supplementary control to the inductor current $I_6$. The supplementary control system 12 acts as a linear current source. The maximum possible inductor current $I_6$, when controlled by the supplementary control system, is defined by the value of the voltage source 5 and the supplementary resistor $R_{SUP}$. The charging time of the inductor 6 is defined by the time constant of the supplementary resistor $R_{SUP}$ and the inductor 6.

The lighting driver 10 also comprises a lighting control system 11. The lighting control system 11 is adapted to output the lighting control signal(s) $S_L$ for the LED(s) $D_L$ of the lighting arrangement 2. Thus the lighting control system controls the on or off state of the LED(s), and may thereby control a level of light output by the LED(s), for example, by using a pulse width modulation scheme.

An operation of the supplementary control system is controlled by a supplementary controller. Here, the supplementary controller is incorporated as an aspect of the lighting control system. Thus, the lighting control system 11 also outputs the supplementary control signal $S_{SUP}$. In other embodiments, a separate supplementary controller controls the operation of the supplementary control system.

In response to the supplementary control signal $S_{SUP}$, the supplementary control system overrides the primary control system 7 and controls the inductor current $I_6$.

The lighting control system 11 is adapted to, in response to the supplementary control system causing the inductor current to reach a predetermined value, control the LED $D_L$ to be in an on-state. That is, the lighting control system controls the lighting control signal $S_L$ based on an inductor current as controlled by the supplementary control system. Thus, the lighting control system is controlled so as to switch the LED $D_L$ to an on-state in response to the inductor current reaching a predetermined value as controlled by the supplementary control signal $S_{SUP}$.

In this way, the supplementary control signal $S_{SUP}$ is considered to be indicative of a desire to switch the LED from an off-state to an on-state. Thus, the supplementary control signal $S_{SUP}$ is indicative of an off-on transition of the LED. The supplementary control signal $S_{SUP}$ may thereby act as a light indication signal.

The lighting control system 11 may monitor the inductor current $I_6$ by, for example, monitoring a voltage across the supplementary resistor $R_{SUP}$ and/or the sensing resistor $R_S$. In some embodiments, the lighting control system 11 may receive a signal from the current monitor 8 of the primary power supply providing an indication of the inductor current $I_6$.

Alternatively, the lighting system 11 may assume that after a predetermined period of operation time of the supplementary control system (e.g. a time of the supplementary control signal $S_{SUP}$ being high), the inductor current $I_6$ has successfully reached the predetermined value. This time may be calculated based on a time constant (T) of the inductor 6 and the supplementary resistor $R_{SUP}$.

For lowest LED flicker, the minimum pulse width of the supplementary control signal should be around three times the time constant T. Otherwise, there remains the possibility for flicker introduction due to different current settings.

For example, if a value of the inductor is 100 µH and a value of the supplementary resistor is 47Ω, there is a time constant of 2.13 µs, Thus, at around 6 µs, it may be assumed that the predetermined value of the inductor current $I_6$ has been reached.

To further reduces the losses of the lighting driver 9, the supplementary control system 7 may be adapted to operate only at deep dimming of the LED arrangement.

In particular, the supplementary control system 12 may be adapted to only be operational when a pulse width of a desired PWM scheme for the LED $D_L$ is below a predetermined value. Thus, the supplementary control signal may only control the supplementary control system when a desired PWM frequency or pulse width of the LED is below a predetermined value. This predetermined value may be defined by a switching frequency of the switched-mode power supply, as LED flicker effects are primarily observed when a pulse width of a PWM lighting control signal is significantly less than a switching period of the switched-mode power supply.

In other embodiments, the supplementary control system 12 is adapted to operate based on a desired dimming level of the lighting arrangement (e.g. based on a signal received from a dimmer). For example, if a desired dimming level is below a predetermined value, this may cause the supplementary control system 12 to become operational.

In the foregoing, the supplementary control signal $S_{SUP}$ is controlled in accordance with a desired on or off state of the LED, and in particular to a desired to switch the LED from an off-state to an on-state, so as to be indicative of an off-on transition of the LED. Thus, the supplementary control signal $S_{SUP}$ may be considered indicative of a desired on or off state of the LED.

As previously mentioned, a supplementary controller outputs and alters the supplementary control signal. Here, the supplementary controller is an aspect of the lighting control system 11. However, in other embodiments the supplementary controller may be a separate arrangement of the lighting driver 9.

The supplementary control signal $S_{SUP}$ may be generated based on a light indication signal or a dimming signal indicative of a desired light output of the LED $D_L$.

For example, the lighting control system 11 may receive a dimming signal from a dimmer (not shown) indicative of a desired dimming level of the LED $D_L$. The lighting control system 11 may generate the supplementary control signal $S_{SUP}$ and the lighting control signal $S_L$ based on the desired dimming level, in accordance with a light modulation scheme (e.g. a PWM scheme).

In yet other embodiments, a light indication signal may be provided to the lighting control system by an existing light controller. The existing light controller may, for example, be a light controller which would have previously controlled the operation of the lighting arrangement in accordance with a modulation scheme. A lighting control system 11 or other supplementary controller may receive such a light indication signal in order to control the supplementary control signal $S_{SUP}$ and/or the lighting control signal $S_L$ appropriately.

Thus, an existing light controller (not shown) may, for example, process a dimming signal or other light intensity signal so as to determine an appropriate pulse width modulation scheme for the LED $D_L$. The supplementary control signal may be controlled to have a same frequency as the determined pulse width modulation scheme, and the lighting control signal may have a same frequency and pulse width as the determined pulse width modulation scheme (to ensure that the LED operates according to the determined PWM scheme).

Thus, embodiments may be installed in existing lighting systems, advantageously allowing for backwards compatibility in existing luminaire systems.

Generally speaking, the lighting control system 11 and/or supplementary controller may output the supplementary control signal $S_{SUP}$ and the lighting control signal $S_L$ in accordance with a desired pulse width modulation scheme or on/off state of the LED.

In some embodiments, the lighting control system 11 or other supplementary controller is adapted to only control the operation of the supplementary control system when a desired pulse width of a PWM scheme for the LED is below a predetermined pulse width length. Preferably, this pulse width length is determined based on the switching frequency of the buck switching signal $S_B$ of the switched-mode power supply.

For example, if a desired pulse width length is less than (e.g. less than half of or less than a quarter of) a period of the buck switching signal $S_B$ (i.e. the reciprocal of the switching frequency), then the lighting control system controls the operation of the supplementary control system; otherwise, the lighting control system does not control the operation of the supplementary control system.

In some examples, the lighting control system 11 may thereby output the lighting control signal(s) to the lighting arrangement without the supplementary control system being activated.

A control scheme of the lighting control system 11 will be described with reference to FIG. 6, which illustrate various signals of the lighting driver 10.

Figure 6:
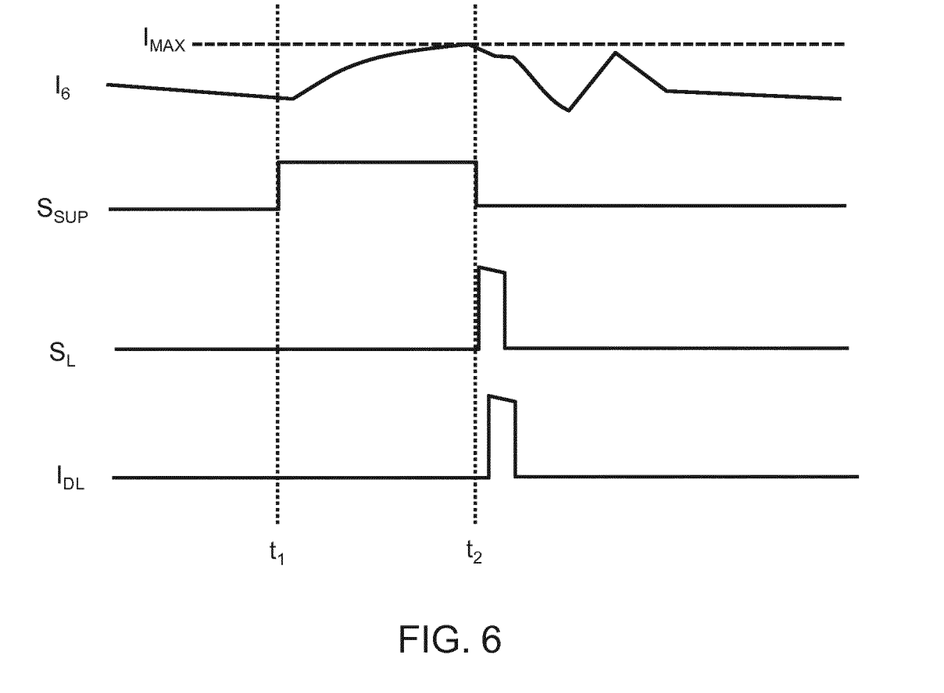
FIGS. 6 and 7 depict signals of the luminaire, comprising the lighting driver according to the embodiment, according to different control schemes.

FIG. 6 illustrates a scenario in which there is a desire to switch the LED $D_L$ on (i.e. from an off-state to an on-state). This may be in accordance with a pulse-width modulation scheme for the LED $D_L$, or possibly at an initial a start-up of the lighting arrangement. A light indication signal, (e.g. from a dimmer or existing light control arrangement) may provide an indication of the desired on or off state of the LED.

FIG. 6 illustrates the inductor current $I_6$, the supplementary control signal $S_{SUP}$, the lighting control signal $S_L$ and the LED current $I_{DL}$.

When there is a desire to switch the LED to an on-state, the supplementary control signal $S_{SUP}$ is triggered high at a time $t_1$. This causes the supplementary control system 12 to override the primary control system 7, and causes the inductor current 6 to rise.

When the inductor current $I_6$ has reached a predetermined value $I_{MAX}$, at a time $t_2$, the supplementary control signal $S_{SUP}$ is switched off, and the lighting control signal $S_L$ is sent high. This causes a current to flow through the LED $D_L$, thereby causing the presence of the LED current $I_{DL}$.

A pulse width of the lighting control signal $S_L$ controls the average intensity of light output by the LED $D_L$.

It will be apparent that the inductor current $I_6$ is at a predetermined value $I_{MAX}$ when the LED $D_L$ is switched on. This results in an average of LED current $I_{DL}$ being the same constant for consecutive pulses of the lighting control signal, and thereby consecutive LED $D_L$ on-state pulses. LED flicker is thereby minimized.

Switching the supplementary control system off (i.e. sending the supplementary control signal $S_{SUP}$ low) when the inductor current $I_6$ has reached the predetermined value minimizes a power loss causes by the supplementary control system (e.g. by driving the load of the supplementary resistor $R_{SUP}$).

When the supplementary control system 12 has been switched off, the primary control system 7 recommences regulating the inductor current $I_6$ using the switching regulator $T_B$, $D_B$ so as to maintain the inductor current $I_6$ within the predetermined range.

The predetermined value $I_{MAX}$ of the inductor current $I_6$ is preferably at or greater than an upper limit $I_H$ of the predetermined range of the inductor current $I_6$ controlled by the primary control system. This inductor current $I_6$ will be sensed by the current monitor 8 of the switched-mode power supply 4 and will prevent the switch-on of the switch $T_B$.

If the value $I_{MAX}$ is above the upper limit $I_H$, a stable situation will exist, in which the switch $T_B$ of the buck converter is switched off when the predetermined value $I_{MAX}$ is reached, and all the inductor/lighting arrangement current flows through the transistor-resistor combination. If the value for $I_{MAX}$ is lower than the upper limit $I_H$, the switch $T_B$ may stay on until $I_{MAX}$ is reached. Although this will effectively reduce a current ripple, it may not make it zero. It is therefore preferred to ensure the predetermined value $I_{MAX}$ is greater than the upper limit $I_H$ of the predetermined range.

It will be apparent from the foregoing that the time constant of the supplementary resistor $R_{SUP}$ and the inductor 6 may restrict a PWM frequency and/or maximum pulse width of a lighting control signal $S_L$. This is due to the need to charge the inductor current $I_6$ to the predetermined value $I_{MAX}$ prior to pulsing the LED $D_L$ on-state.

Figure 7:
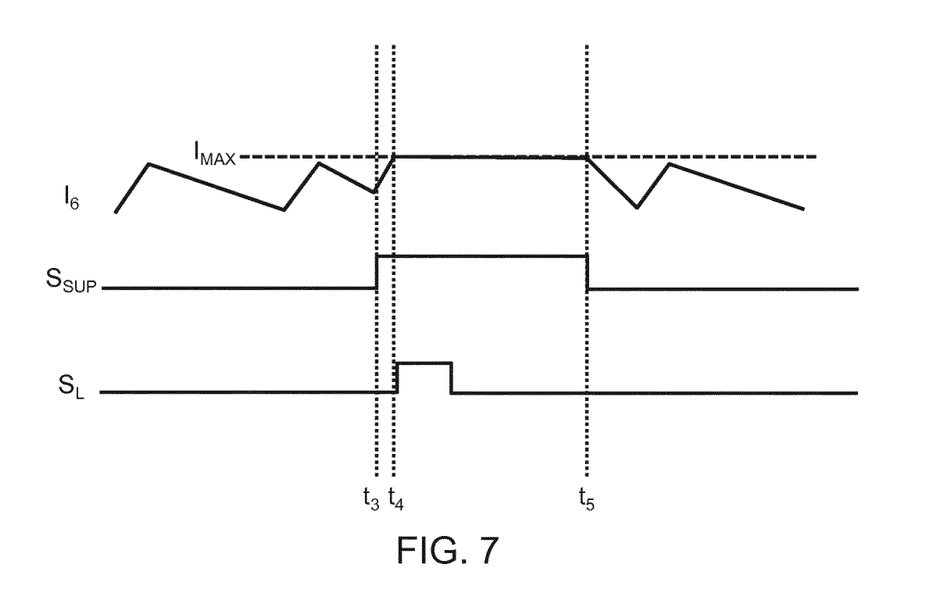

FIG. 7 illustrates an alternative control scheme for the lighting control system 11. FIG. 7 illustrates the inductor current $I_6$, the supplementary control signal $S_{SUP}$ and the lighting control signal $S_L$.

Before a time $t_3$, the inductor current is regulated by the primary control system 7 so as to alternate between a high level and low level (i.e. within a predetermined range).

At a time $t_3$ there is a desire to switch the LED to an on-state. The supplementary signal $S_{SUP}$ is triggered high, and the inductor current $I_6$ begins to increase (as controlled by the supplementary control system 12).

At a time $t_4$, the current through the inductor has reached a predetermined value $I_{MAX}$. However, contrary to the previous control scheme, the supplementary signal $S_{SUP}$ is not switched off, and the inductor current $I_6$ is held at the predetermined value $I_{MAX}$. The lighting control signal $S_L$ can then be switched on (e.g. according to a PWM scheme). The supplementary control signal $S_{SUP}$ maintains the inductor current at the predetermined value $I_{MAX}$ whilst the LED $D_L$ is on and the lighting control signal $S_L$ is high. Thus, the LED current $I_{DL}$ is constant during an on-state of the LED $D_L$, thereby further minimizing LED flicker.

At a time $t_5$ the supplementary control signal $S_{SUP}$ is sent low, and the primary control system 7 recommences alternating the inductor current $I_6$ between a high and low level.

Thus, the supplementary control signal $S_{SUP}$ is controlled in accordance with a desired lighting scheme of the LED $D_L$. In particular, when it is desired to switch the LED $D_L$ to an on-state, the supplementary control signal switches the supplementary control system on, and sets the inductor current $I_6$ to a predetermined value. The lighting control signal $S_L$ is subsequently triggered in accordance with the desired lighting scheme, so as to thereby control an output of the LED $D_L$.

In some embodiments, the LED is controlled according to a pulse width modulation scheme. In such embodiments, a frequency of the supplementary control signal and the lighting control signal is the same. A duty cycle of the lighting control signal may vary according to the desired lighting intensity. A duty cycle of the supplementary control signal may vary dynamically, as it depends upon a present inductor current $I_6$, which varies according to the buck control signal $S_B$.

In at least one embodiment, the supplementary control signal $S_{SUP}$ controls the operation of the supplementary control system for at least predetermined period of time before each pulse of a pulse-width modulated lighting control signal $S_L$. For example, this predetermined period of time may be calculated based on a time constant T of the inductor and the supplementary resistors $R_{SUP}$. For lowest LED flicker, the minimum predetermined period of time should be around three times this time constant T, for example, around four times the time constant T.

Figure 8:
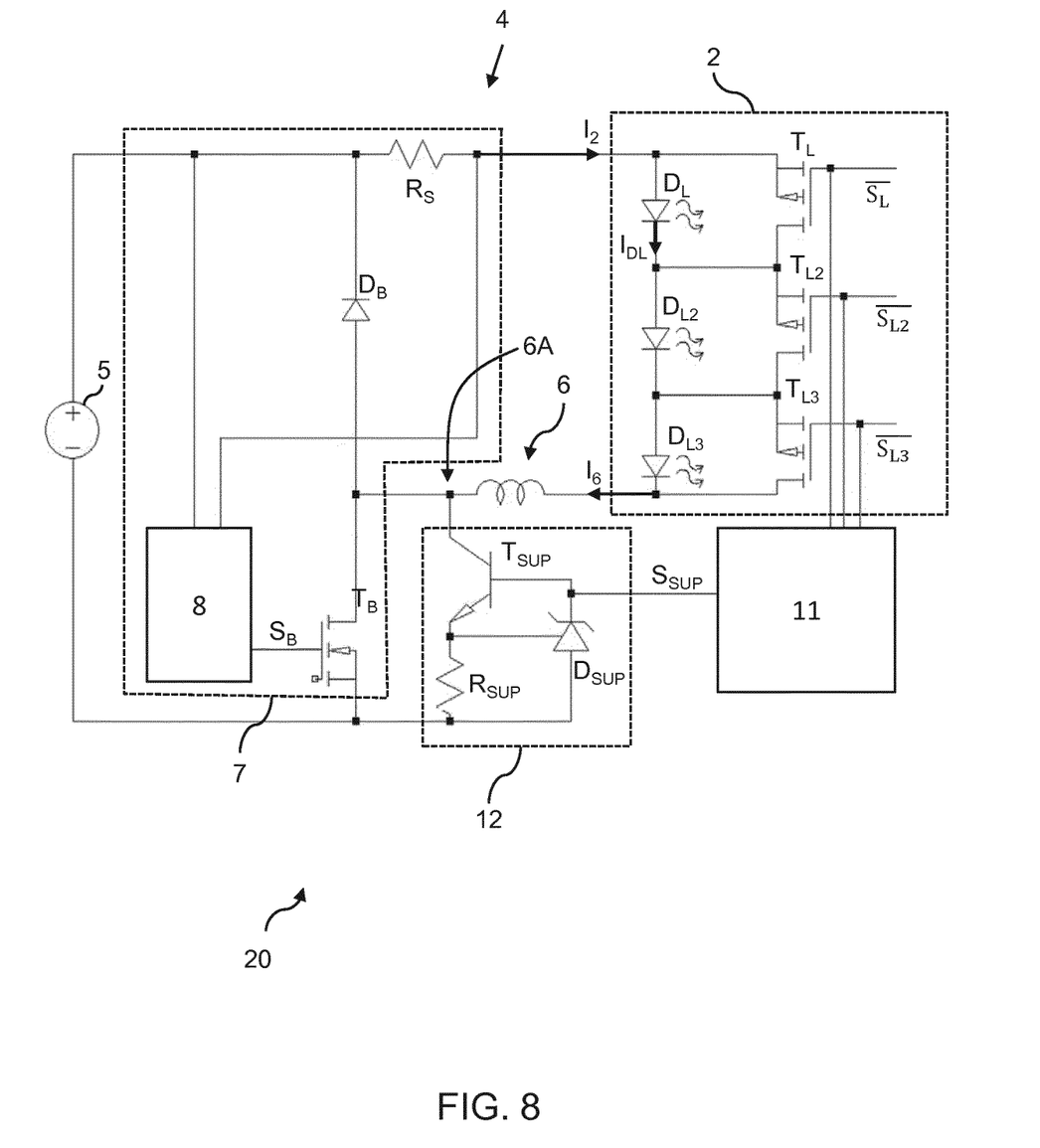
FIG. 8 illustrates a circuit diagram of a luminaire comprising a lighting driver according to another embodiment.

FIG. 8 provides a circuit diagram of a lighting driver 20 according to another embodiment. The lighting driver 20 consists of a slightly amended lighting driver 10. Description of the same or similar components will not be repeated for the sake of brevity.

The supplementary control system 12 is further provided with a shunt regulator $D_{SUP}$. This shunt regulator is adapted to ensure that the supplementary transistor $T_{SUP}$ operates in its linear region. Provision of such a shunt regulator decreases the settling time for the inductor current to reach the predetermined value. The settling time is the length of time that the supplementary control system 7 takes to charge the inductor 16.

Such an embodiment is particularly beneficial to reducing power losses. Moreover, this ensures that an obtained inductor current is independent of the voltage across the lighting arrangement 2 which might change due, for example, to appropriate shunt switching of the switched-mode power supply. Shunt switching of the switched-mode power supply may be performed to, for example, alter an intensity of light output by the lighting arrangement.

In some embodiments, rather than a lighting system 11 providing both the supplementary control signal $S_{SUP}$ and the lighting control signal $S_L$, the supplementary control signal $S_{SUP}$ may be derived from existing (i.e. from known devices) light control signals intended to control the lighting arrangement. A lighting control system 11 may receive the existing light control signals and/or the derived supplementary control signal, to determine when to output lighting control signals to the lighting arrangement.

Thus, existing lighting control signals may be intercepted, and used to generate the supplementary control system and new lighting control signals. The existing lighting control signals may be pulsing signals in accordance with a PWM scheme. The new lighting control signals may, for example, have a same pulse width and frequency as the existing lighting control signals, but are phase shifted to account for the charging of the inductor caused by the supplementary control system.

The phase shift may be by a predetermined period of time, for example, a predetermined period of time for which the supplementary control signal is high. Alternatively, the amount of phase shift may be dynamic for successive cycles of the lighting control signal, and depends upon the settling time of the supplementary control system.

The current monitor 8, the supplementary control system 12 and the lighting control system 11 may be formed as a single controller or microcontroller. This further decreases an energy usage of the lighting driver 10.

Figure 9:
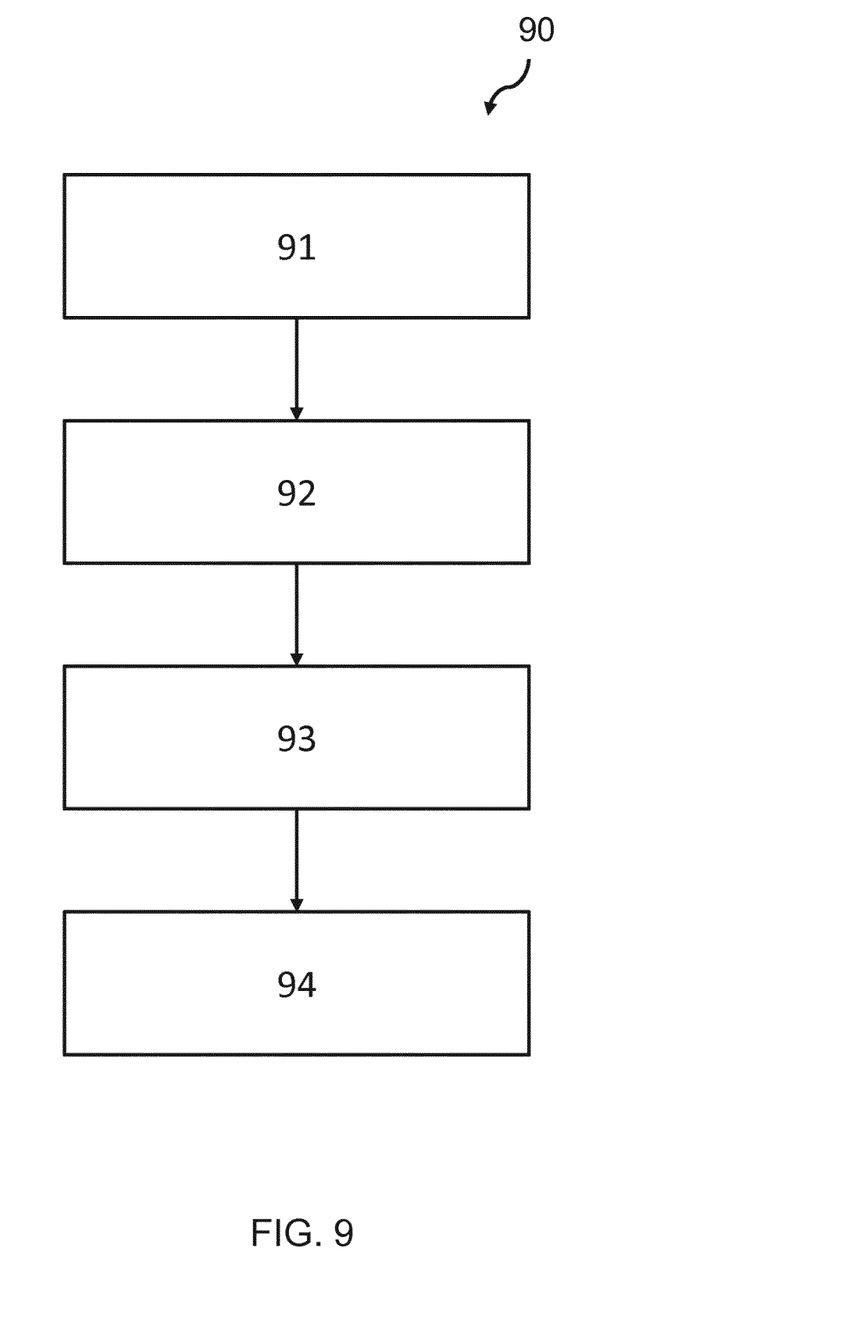
FIG. 9 is a flowchart illustrating a method according to an embodiment.

FIG. 9 illustrates a method 90 of controlling an LED according to an embodiment, wherein an on or off state of the LED is controlled by a lighting control signal. The method comprises using a primary control system, maintaining 91 a current through an inductor of a switched-mode power supply within a predetermined range, wherein a current through the inductor defines a current through the lighting arrangement; obtaining 92 a supplementary control signal indicative of a desired off-on transition of the LED; using a supplementary control system and in response to the supplementary control signal indicating a desire to switch the LED to the on-state, overriding 93 the primary control system and altering a current through the inductor of the switched-mode power supply; and using a lighting control system adapted to output the lighting control signal, in response to supplementary control system altering the current through the inductor of the switched-mode power supply and the current through the inductor reaching a predetermined level, controlling 94 the lighting control signal so as to switch the LED to an on-state.

As discussed above, embodiments make use of a controller. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:
1. An LED lighting driver comprising:
an LED ($D_L$) wherein an on or off state of the LED (DL) is controlled by a lighting control signal ($S_L$);
a bypass transistor connected in parallel with the LED (DL), wherein the bypass transistor is adapted to control a current flow in the LED (DL) based on the lighting control signal;
a switched-mode power supply comprising:
an inductor connectable to the lighting arrangement, wherein a current ($I_6$) through the inductor defines a current ($I_2$) through the lighting arrangement; and
a primary control system adapted to maintain a current through the inductor and lighting arrangement within a predetermined range using a switching regulator ($T_B$, $D_B$);
a supplementary control system adapted to:
receive a supplementary control signal ($S_{SUP}$) indicative of a desired off-on transition of the LED; and
in response to the supplementary control signal indicating a desire to switch the LED to an on-state, override the primary control system and alter a current through the inductor to a predetermined level; and
a lighting control system adapted to output the lighting control signal and, in response to the current through the inductor being altered by the supplementary control system and reaching the predetermined level, control the lighting control signal so as to switch the LED to an on-state.

2. The LED lighting driver of claim 1, wherein the supplementary control system is adapted to selectively couple a first end of the inductor to a reference voltage.

3. The LED lighting driver of claim 2, wherein the supplementary control system comprises a transistor ($T_{SUP}$) and resistor ($R_{SUP}$) connected in series between the first end of the inductor and the reference voltage.

4. The LED lighting driver of claim 1, wherein:
the switched-mode power supply comprises a diode ($D_B$) coupled between a first end of the inductor and the lighting arrangement;
a second end of the inductor is coupled to the lighting arrangement; and
the primary control system of the switched-mode power supply is adapted to selectively couple the first end of the inductor to a reference voltage.

5. The LED lighting driver of claim 1, wherein the supplementary control signal is a pulsing signal in accordance with a pulse width modulation scheme for the LED, and optionally wherein the lighting control signal is a pulsing signal having a same frequency as the supplementary control signal.

6. The LED lighting driver of claim 1, wherein the supplementary control system is further adapted to override the primary control system only when the lighting control signal is a pulsing signal in accordance with a pulse width modulation scheme for the LED, and a desired pulse width of the lighting control signal is below a predetermined pulse width value.

7. The LED lighting driver of claim 6, wherein the predetermined pulse width value is determined based on a switching frequency of the switched-mode power supply.

8. The LED lighting driver of claim 1, wherein the supplementary control system is further adapted to maintain a current through the inductor at the predetermined level at least whilst the lighting control signal controls the LED to be in the on-state.

9. The LED lighting driver of claim 1, wherein the supplementary control system no longer overrides the primary control system and no longer alters the current through the inductor in response to the current through the inductor reaching the predetermined level.

10. A method of controlling an LED of a lighting arrangement, wherein an on or off state of the LED is controlled by a lighting control signal, the method comprising:
using a primary control system, maintaining a current through an inductor of a switched-mode power supply within a predetermined range, wherein a current through the inductor defines a current through the lighting arrangement;
obtaining a supplementary control signal indicative of a desired off-on transition of the LED;
using a supplementary control system and in response to the supplementary control signal indicating a desire to switch the LED to the on-state, overriding the primary control system and altering a current through the inductor of the switched-mode power supply; and
using a lighting control system adapted to output the lighting control signal, in response to supplementary control system altering the current through the inductor of the switched-mode power supply and the current through the inductor reaching a predetermined level, controlling the lighting control signal so as to switch the LED to an on-state.

11. The method of controlling an LED of a lighting arrangement of claim 10, wherein the supplementary control signal is a pulsing signal in accordance with a pulse width modulation scheme for the LED.

12. The method of controlling an LED of a lighting arrangement of claim 10, further comprising, using the supplementary control system, maintaining a current through the inductor at the predetermined level at least whilst the lighting control signal controls the LED to be in an on-state.

13. The method of controlling an LED of a lighting arrangement of claim 10, further comprising no longer overriding the primary control system and no longer altering the current through the inductor using the supplementary control system, in response to the current through the inductor reaching the predetermined level.

* * * * *